United States Patent [19]

Czerniewicz

[11] 4,412,571

[45] Nov. 1, 1983

[54] POWER CHISEL

[76] Inventor: John F. Czerniewicz, 337 Foch Blvd., Mineola, N.Y. 11501

[21] Appl. No.: 272,739

[22] Filed: Jun. 11, 1981

[51] Int. Cl.³ .................. B27G 13/00; B27C 5/10
[52] U.S. Cl. .................. 144/219; 144/70; 144/144 R; 408/228
[58] Field of Search .............. 144/70, 218, 219; 145/116–121; 408/202, 204, 206, 212, 213

[56] References Cited

U.S. PATENT DOCUMENTS

| | | | |
|---|---|---|---|
| 433,683 | 8/1890 | Jennings | 408/212 |
| 1,410,534 | 3/1922 | Stein | 408/212 |
| 3,130,763 | 4/1964 | Schlosser et al. | 408/212 |
| 3,656,521 | 4/1972 | Czerniewicz | 144/219 |
| 4,050,841 | 9/1977 | Hildebrandt | 408/213 |

*Primary Examiner*—W. D. Bray
*Attorney, Agent, or Firm*—James P. Malone

[57] ABSTRACT

A laterally movable hand held motor driven cutting tool adapted to cut grooves of predetermined depth in wood, has a cutting bit with a hollow tubular cutting end. A plurality of peripheral chisel shaped cutting edges are formed in the tubular end. The cutting edges are spaced by semi-elliptical knife-like portions of the tubular end. A depth adjusting ring and guide are provided to control the depth of the grooves.

3 Claims, 16 Drawing Figures

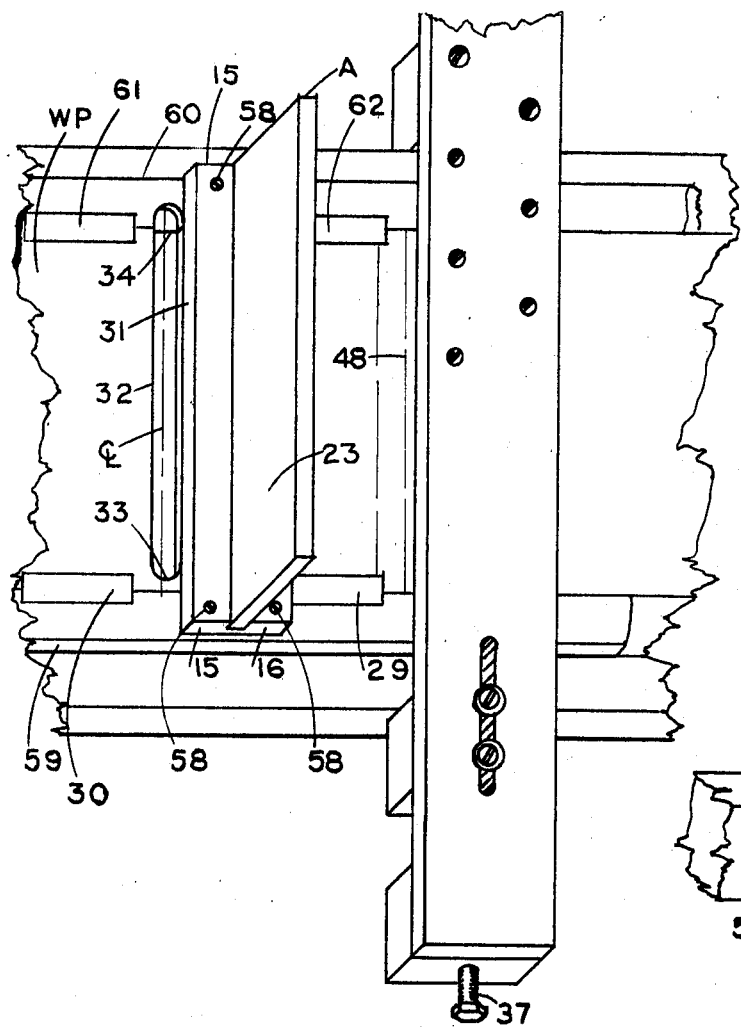
FIG. 7
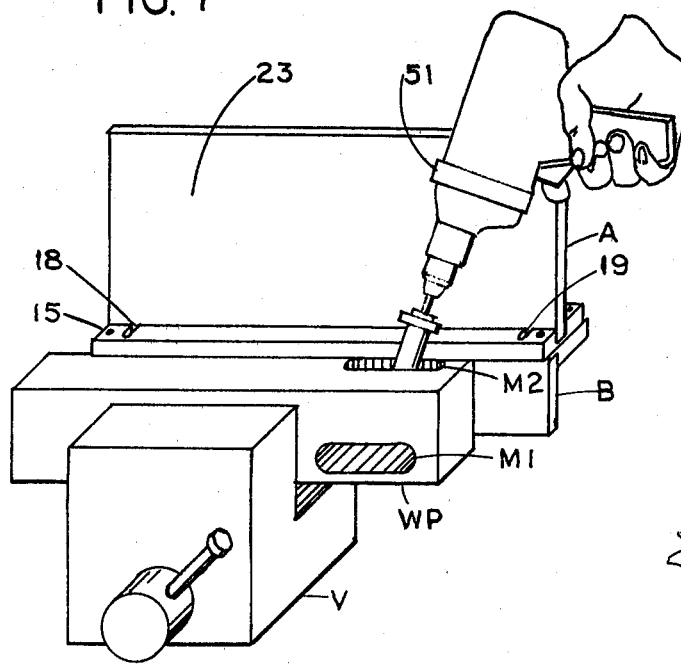
FIG. 8
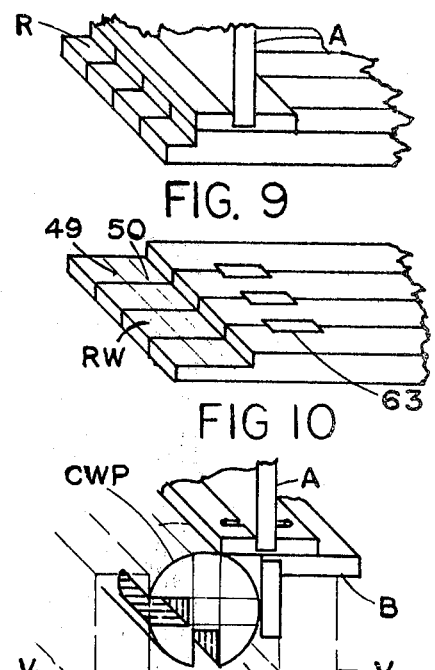
FIG. 9
FIG 10
FIG. 11
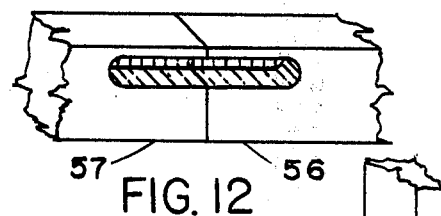
FIG. 12
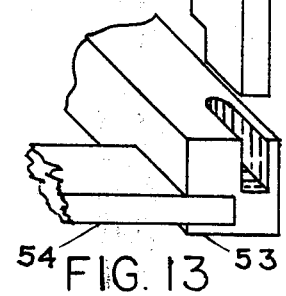
FIG. 13
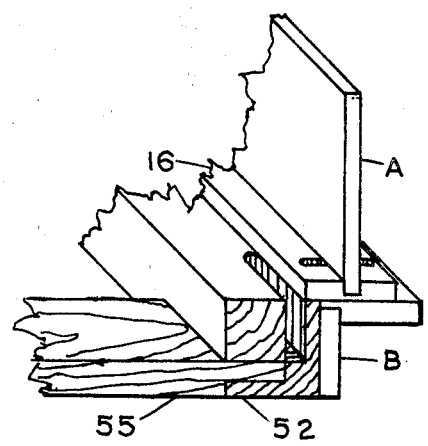
FIG. 14

POWER CHISEL

TECHNICAL FIELD

This invention relates to power chisels and more particularly to a hand held power chisel for cutting slots, grooves, dados, rabbets and mortises and wood.

BACKGROUND ART

This application is an improvement of my prior U.S. Pat. No. 3,656,521 for "POWER CHISEL" granted on Apr. 18, 1972.

THE INVENTION

The new rotary chisel cuts faster and better because the sharp chisel edges are presented to the wood at the correct angle for cutting like a chisel. The old power chisel had inwardly extending blades which were presented to the wood at 90 degrees to perform a slower and less efficient scraping action.

The present chisel edges cut the hardest woods faster and with less power needed because they are only 1/16" wide and can be kept sharp very easily. The blades on the old power chisel were about three times as wide and hard to sharpen so they used more energy which created useless heat while removing less material, especially in hard woods.

OBJECTS OF THE INVENTION

Accordingly, a principal object of the invention is to provide new and improved power chisel means.

Another object of the invention is to provide new and improved power chisel means for cutting slots, grooves, dados, rabbets, mortises and wood.

Another object of the invention is to provide new and improved, power chisel means, a laterally movable motor driven cutting tool adapted to cut grooves of predetermined depth comprising cutting means having a hollow tubular cutting end, a plurality of peripheral chisel edges formed in said tubular end, said edges being spaced by semi-elliptical knife-like portions of said tubular end.

These and other objects of the invention will be apparent from the following specification and drawings of which:

BRIEF DESCRIPTON OF THE DRAWINGS

FIG. 2 is a partial section of the end of the tool blank prior to grinding the cutting edges.

FIG. 7 is a pictorial view of accessories assembled to cut a dado.

FIG. 8 is a pictorial view of the tool and accessories assembled to cut a mortise.

FIG. 9 is a pictorial view of the guide being used to cut a rabbet.

FIG. 10 is a pictorial drawing of a widened rabbet.

FIG. 11 is a pictorial drawing of accessories assembled to cut a mortise in a cylindrical work piece.

FIG. 12 is a pictorial drawing of a mortise cut into two work pieces simultaneously.

FIG. 13 is a pictorial drawing of a bare face tennon assembly.

FIG. 14 is a pictorial drawing of a flush face joint assembly.

BEST MODE OF THE INVENTION

Figures 1, 1A, 3, 3A:
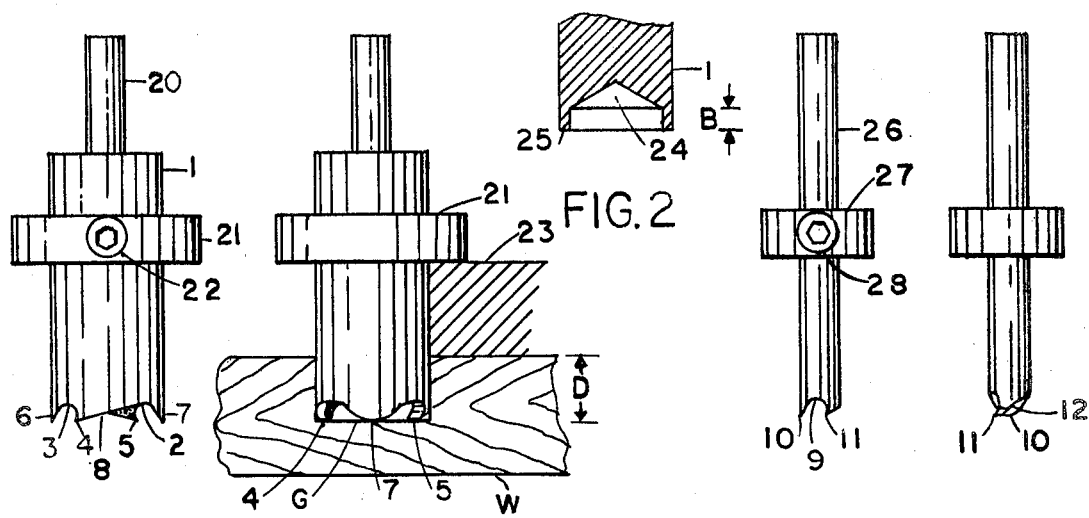
FIG. 1 shows a front view of the tool.
FIG. 1A is a side view of FIG. 1 with a partial section of groove cut into wood, the depth of which is limited by the depth gauge ring resting on the guide.
FIG. 3 is a front view of the ¼" chisel.
FIG. 3A is a side view of FIG. 3.

FIGS. 1 and 1A illustrate an embodiment of the invention. The cutting member 1, has a shallow tubular shape at its cutting end, as shown in the partial section of FIG. 2. A pair of knife-like scoring members 6, 7, are separated from a following pair of chisel-like cutting members 4, 5, by the sloping grooves 2, 3. The slope 18, provides the proper angle of attack for chisel edge 4. The upper end of cutting member 1 has a shank portion 20, which is adaped to be fit into a power drill. A depth guide 21, is adjustably connected to the cutting member by means of a set screw 22. The depth guide ring is adapted to ride on guide 23 which is placed on top of the work piece W for the purpose of cutting the groove G. The guide member 23 may be straight, or it may be curved, or formed as desired. The adjustments of the ring 21, on the cutting member 1 controls the depth D of the groove.

FIG. 2 illustrates the tubular form of the cutting end of the tool blank prior to grinding grooves 2, 3, to form cutting edges 4, 5, 6, 7. A hole 24 is drilled into the end of cutting member 1, to shallow depth B, generally about ⅛".

FIGS. 3 and 3A illustrate an embodiment of the invention with the smallest practical diameter, generally about ¼" diameter. The cutting member 26 extends the full length to the top which is adapted to be fit into a power drill. The depth guide ring 27 and set screw 28 are similar to and serve the same purpose as depth guide 21 and set screw 22 in FIGS. 1 and 1A. There is, however, only one knife-like scoring member 10, and chisel-like cutting member 11, separated and formed by the single sloping groove 9. Slope 12 provides relief for chisel edge 11.

Figure 4:
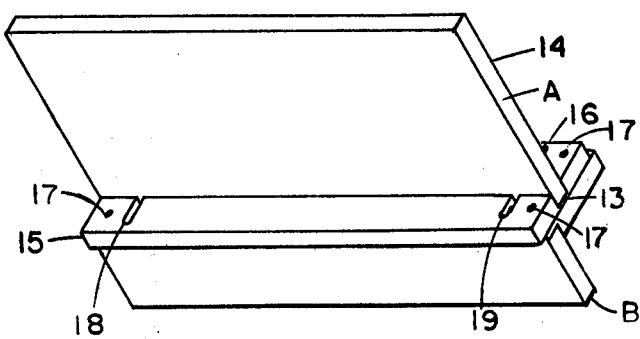
FIG. 4 is a pictorial drawing of the guide assembly.

FIG. 4 is an isometric drawing of the guide used with the rotary chisel in making all of the common woodworking joints. It consists of two separable units A and B, which can be clamped together with bolts and nuts in slots 18 and 19. Unit A, has a grooved base 13 into which the vertical member 14 is permanently fastened, to separate guide strip 15, which is 1" wide from guide strip 16, which is 1⅛" wide. Holes 17 at each end of these guide strips are for screws to fasten the guide for dados and grooves, as shown in FIG. 7. Unit A and B together are held to the work piece in a vise for cutting mortises, as shown in FIGS. 8, 11 and 14.

Figure 5:
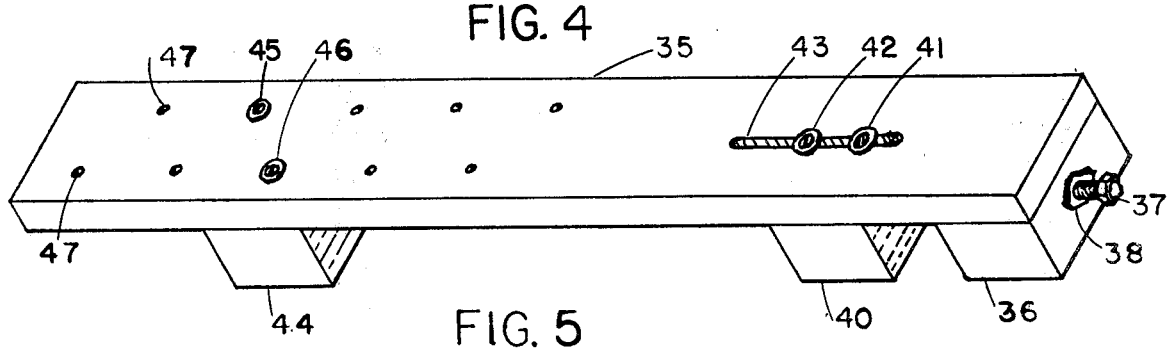
FIG. 5 is an isometric or pictorial drawing of the flexible back clamp.

FIG. 5 is an isometric drawing of a special flexible bar clamp. Bar 35 is a piece of wood long enough to span the width of the average work bench top. Block 36 is permanently fastened to bark 35 and is fitted with a long machine screw 37, which passes through bearing 38 and threaded nut 39, FIG. 6, to bear against block 40, which is held in place against bar 35, with two screws 41, 42, which pass through slots 43 and are loose enough to let block 40, move back and forth. Block 44, is attached to bar 35, with machine screws 45, 46, which pass through holes 47, to locate block 44 in any desired position.

Figure 6:
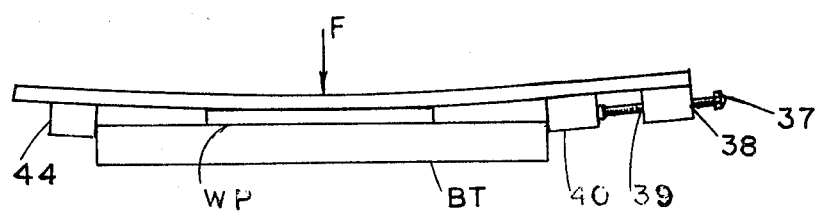
FIG. 6 is a side view of the clamp to show its clamping action.

FIG. 6 is an explanatory side view of the bar clamp to show the bar 35 will bend when the screw 37 is tightened to squeeze the bench top BT, between block 40 and 44, and force F is created to press down against the work piece WP to hold it immovable on the bench while operations are performed on it.

FIG. 7 is a cabinet drawing showing dado guide unit A in position for the cutting of a $\frac{3}{4}''$ dado 32. Screws 58, fasten the unit to pieces of scrap wood 59, 60, adjoining work piece WP to which they are attached with strips of masking tape 61, 62, 29 and 30. The rotary chisel in the electric drill is placed on work piece WP with the drill body touch surface 23 of the vertical member and tilted back from a perpendicular about 15 degrees as shown in FIG. 8. When the trigger is squeezed, and the tool rotates, it will roll or pull to the right and press against the edge of the guide strip 31; therefore, the guide must always be to the right of the tool. The too, while rotating, is moved from one end of the cut to the other and will cut when pushed or pulled. As it is moved back and forth, the cut will become deeper and the drill should gradually be moved to a vertical position as the preset depth guide ring touches the top surface of the guide strip, and the dado 32 is finished. End 33 is a blind dado which will not be visible when the mating piece is fitted. End 34 is a through dado, made by running the tool past the edge of the work piece WP into the scrap piece 26.

In FIG. 7, we can release the work piece by loosening the screw 37. Then we can lift the guide A, still screwed to the scrap pieces 59, 60, and the tape strips 61, 62, 29, 30, will lift off the work piece. Guide edge 31 will be moved to pencil line 48, the tape strips pressed down on the work piece, the clamp screw 37, tightened to hold down the work piece and the next dado can be cut. This method provides a speedy way to cut a series of perfect dado joints.

FIG. 8 shows the guide assembly A, B, clamped to the work piece WP in a vise V to guide the rotary chisel while cutting a mortise M2. The mortise M1 was made in the same manner but with the work piece WP turned end for end. The guide A is attached to the base B with screws and nuts (not shown) passing through the slots 18, 19 and is adjusted relative to base B to provide the desired thickness of material between the side of the mortise and the outside of the workpiece. The electric drill body is padded to a thickness of $2\frac{3}{4}''$ with a band of paper and tape 51 so that its center line is held at $1\frac{3}{8}''$ from the wall 23 as contact with that wall is maintained. At the lower end, the guide strip 15 is 1'' wide and the tool diameter is $\frac{3}{4}''$ ($\frac{3}{8}''$ radius) so that the sum of these is also $1\frac{3}{8}''$ equal to the distance of the center line $C_L$ of FIG. 7, of the tool and groove from wall 23. Therefore, the mortises M1, M2 and all others made this way will have side walls parallel to the outside faces of the work piece WP, and if that piece is square, the assembly of all the legs and rails will be correct and easy to accomplish.

FIG. 9 is a partial drawing of the guide A used at the end of the work piece to cut a rabbet R. Several piecess may be cut simultaneously by taping them together.

FIG. 10 is a picture drawing of the rabbet R in FIG. 9, widened to become rabbet RW by moving guide A to line 49, making a second cut and then moving the guide to line 50 to make a third cut. This could produce an end lap joint for making a rectangular frame. It could also produce a tenon, as on the rails 55 shown in FIG. 14 to make a flush rail mortise and tenon joint. Several pieces can be cut simultaneously by securing them, edge to edge, with tape 63.

FIG. 11 illustrates the versatility of the guide assembly by showing the guide unit A adjusted to the base unit B to cut mortises in the cylindrical work piece CWP, all held in position by vise V (transparent). Attachment of legs to this piece to make a pedestal table produces an assembly very much stronger than the usual method of using dowel joints, and is easier to make.

FIG. 12 shows how a pair of legs, 56, 57, of a piece of furniture can be fitted with two mortises simultaneously by clamping them in the guide with top ends butting. The open top blind mortise so constructed can produce a joint stronger than the wood.

FIG. 13 shows such a joint being assembled. Pressure applied with a clamp to marginal part 53 against tenon 54 will squeeze the glue in this snug fitting joint into the pores of the wood to weld them into a unit.

FIG. 14 shows a mortise cut with the $\frac{1}{2}''$ chisel to produce a joint with leg surface 52, and rail surface 55 flush. The guide unit A is attached to the base unit B so that the $1\frac{1}{8}''$ guide rail 16 is on the work side. The $\frac{1}{4}''$ radius of the $\frac{1}{2}''$ rotary chisel added to the $1\frac{1}{8}''$ guide rail width brings the center line of the tool the proper $1\frac{3}{8}''$ from vertical face 23 to maintain a parallel alignment of the mortise and the working piece face.

This invention has improvements over my prior patent as follows:

1. The new rotary chisel cuts faster and better because the sharp chisel edges 4 and 5, in FIG. 1, are presented to the wood at the correct angle for cutting like a chisel. The old power chisel had inwardly extending blades which were presented to the wood at 90 degrees to perform a slower and less efficient scraping action.

2. The chisel edges cut the hardest woods faster and with less power needed because they are only 1/16'' wide and can be kept sharp very easily. The blades on the old power chisel were about three times as wide and hard to sharpen so they used more energy which created useless heat while removing less material, especially in hard woods.

3. These chisel edges 4 and 5, in FIG. 1, are on the circumference and help produce a clean cut with no burr on the edges. The blades on the old power chisel were inside the circumference and did not help to produce clean side walls on the joint being cut, but often left a burr on the edge which had to be removed with sandpaper.

4. The present rotary chisel has a shallow tubular shape only $\frac{1}{8}''$ deep (see FIG. 2) which prevents the tool from digging in more than that depth which is not apt to stall the forward motion of the tool. The old power chisel had a tubular shape about 1'' deep which could not control digging in, which was often a problem.

5. The present rotary chisel has semi-elliptical profile knife edges 6 and 7, FIG. 1, which press the wood fibers down as they sever them cleanly. The old power chisel had a small cutting spur which did not press down on the wood fibers while cutting them and often tore them upward to produce an objectionable burr on the edge of the groove.

6. The present rotary chisel is much easier and less costly to manufacture. Both the $\frac{3}{4}''$ and the $\frac{1}{2}''$ blanks include the $\frac{1}{8}''$ deep tubular bottom shown in FIG. 2, the $\frac{1}{4}''$ diameter blank is not so drilled. The blanks are hardened and tempered before grinding to prevent distortion and guarantee the keenest cutting edges. Two angular grooves 2 and 3, are ground $\frac{1}{8}''$ deep to form both the knife edges and chisel ends. A second grinding operation forms the relief 8, back of each chisel edge to finish the tool. A single angular groove 9, produces both knife edge 10 and chisel edge 11, in the ¼" chisel and a second grinding 12, produces the relief back of the chisel edge. The old power chisel required many more operations as shown in the drawings for that patent. After all the drilling, milling and bending operations were performed, the tool was subjected to heat treatment which resulted in some distortion and considerable damage to the cutting edges.

7. The present rotary chisel can be made of the least expensive heat treatable tool steel. The old power chisel required expensive steel which would allow the bending of the blades without fracturing the metal.

8. The present rotary chisel is provided with a combination two piece guide which is used for cutting dados, rabbets, mortises and every one of the common woodworking joints except the dovetail. This enables the owner of the tool to use it immediately to help him cut perfect joints. The old power chisel required the user to make guides before the tool could be used, FIG. 4.

9. The upper portion 13, of the two piece guide, FIG. 4, includes a vertical wall member 14, which serves to align the drill body center line with the perpendicular center line of the dado or mortise so that every groove, dado or mortise holds its mating piece at right angles to its surface. The old guides, built to instructions furnished with the old power chisel, did not incorporate this alignment wall so that the user had to guess at a vertical drill position and this often resulted in off-square assemblies.

10. The lower portion 19, is used in combination with the upper portion 13, for cutting mortises and can be adjusted to any needed position relative to the upper portion with clamping bolts which pass through slots 18, in both portions. How this adjustable relations of the upper and lower portion is used in joinery can be seen in FIGS. 8, 14 and 11. The mortise guide described in my old POWER CHISEL, U.S. Pat. No. 3,656,521, was basic and had none of this capability.

11. The dado guide is screwed to scrap pieces which are held firmly in place against the work stock while the cut is being made, FIG. 7, by piece of masking tape. To move the guide to the next position, it is only necessary to lift the entire assembly of guide and scrap wood pieces so that the tape lifts off the work stock. When the guide is located in a new position, the tape is again pressed down on the work stock and the next cut can be made. To move the guide for may old POWER CHISEL, screws had to be removed and replaced in the new position each time a move was made, a time consuming operation which also left undesirable holes in the work stock.

12. Before the first cut can be made, means must be found to hold the work stock firmly and immovably on the work bench top. Available clamps are often unsatisfactory because of their limited reach. The flexible back bar clamp, to be furnished as part of the rotary chisel kit, FIG. 5, solves this probelm quickly and easily. As shown in FIG. 6, it is placed on top of the work piece and clamped to front and back edges of the work bench. This causes the flexible back of the clamp to come down in the middle, with pressure on the work piece, as shown in FIG. 6, to hold the work and the guide securely while cutting the dado, FIG. 7.

It is claimed:

1. A laterally movable motor driven cutting means adapted to cut grooves of predetermined depth comprising:
   cutting means having a hollow tubular cutting end,
   a plurality of peripheral chisel cutting edges formed in said tubular end, and semi-elliptical knife-like portions in said tubular end separating the cutting edges.

2. Apparatus as in claim 1 wherein the cutting edges taper back to the adjoining cutting edges.

3. Apparatus as in claim 2 having depth adjusting means adjustably mounted on said cutting means.

* * * * *